(12) United States Patent
Durand, Jr. et al.

(10) Patent No.: US 8,796,358 B2
(45) Date of Patent: Aug. 5, 2014

(54) VISCOELASTICITY OF INKS FOR HIGH SPEEDING PRINTING

(75) Inventors: Richard R. Durand, Jr., Oradell, NJ (US); Saeid Savarmand, Bergenfield, NJ (US); Stephen Postle, Glen Rock, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 157 days.

(21) Appl. No.: 13/581,215

(22) PCT Filed: Mar. 1, 2011

(86) PCT No.: PCT/US2011/026678
§ 371 (c)(1),
(2), (4) Date: Aug. 24, 2012

(87) PCT Pub. No.: WO2011/109391
PCT Pub. Date: Sep. 9, 2011

(65) Prior Publication Data
US 2012/0325102 A1    Dec. 27, 2012

Related U.S. Application Data

(60) Provisional application No. 61/309,028, filed on Mar. 1, 2010.

(51) Int. Cl.
*B41F 31/00* (2006.01)
*C09D 11/10* (2014.01)

(52) U.S. Cl.
CPC ............ *B41F 31/00* (2013.01); *C09D 11/10* (2013.01)
USPC .......................................... 523/160; 523/161

(58) Field of Classification Search
CPC .......... C09D 11/02; C09D 11/10; B41F 31/00
USPC .................................................. 523/160, 161
See application file for complete search history.

(56) References Cited

U.S. PATENT DOCUMENTS

| | | |
|---|---|---|
| 4,839,665 A | 6/1989 | Hertz et al. |
| 4,897,332 A | 1/1990 | Gibson et al. |
| 5,507,864 A | 4/1996 | Jaeger et al. |
| 2006/0068132 A1 | 3/2006 | Nakao et al. |
| 2008/0161464 A1 | 7/2008 | Marks et al. |

*Primary Examiner* — Doris Lee
(74) *Attorney, Agent, or Firm* — Charles C. Achkar; Ostrolenk Faber LLP

(57) ABSTRACT

An ink for high-speed printing is formulated by controlling the phase angle of the ink to less than 60° at a frequency of 10 Hz when the ratio of the total non-volatiles volume fraction of the ink to the maximum total non-volatiles volume fraction of the ink is a ratio between about 0.40 to about 0.90. An ink for high-speed printing includes one or more resins, one or more colorants, one or more solvents, and one or more additives. The ink can be a flexographic ink, a rotogravure ink, a heatset offset ink, or a publication gravure ink. A print of the ink includes less than 1% of pinholes by area. The ink is applied to a substrate, which moves at a speed of greater than 1200 feet/min.

22 Claims, 2 Drawing Sheets

Phase angles of printing inks (measured by an oscillatory shear test) as a function of vol%TNV (total non-volatiles).

Phase angles of printing inks (measured by an oscillatory shear test) as a function of the ratio of the total non-volatiles volume fraction to the maximum total non-volatiles volume fraction.

Photomicrographs of Inks #1-4

VISCOELASTICITY OF INKS FOR HIGH SPEEDING PRINTING

This application is a National State Application of PCT/US2011/026678, filed Mar. 1, 2011, which claims the benefit of U.S. Provisional Patent Application No. 61/309,028, filed on Mar. 1, 2010, all of which are hereby incorporated by reference for all purposes as if fully set forth herein.

FIELD OF INVENTION

The present invention relates to the viscoelasticity of inks for high speeding printing. More specifically, the present invention relates to controlling the viscoelasticity to enhance the quality of printing at high speed.

BACKGROUND OF THE INVENTION

Flexography is one method of printing words and images onto foil, plastic film, corrugated board, paper, paperboard, cellophane, or even fabric. In fact, since the flexographic process can be used to print on such a wide variety of materials, it is often the best graphic arts reproduction process for package printing.

The anilox cylinder serves as the heart of the flexographic press. The use of an ink-metering anilox cylinder, which is engraved with a cell pattern, enables an even and fast ink transfer to the printing plate. The configuration of the cells in the anilox roller, the pressure between the rollers, and the use of a doctor blade mechanism control the amount of ink transferred to the printing plate. The shape and volume of the cells are chosen to suit the anilox surface (chrome or ceramic), the doctoring system, the press capabilities, the printing substrate, and the image type (solid or halftone). Advances in anilox technology have resulted in laser-engraved ceramic anilox rollers offering tougher and longwearing rollers with greatly improved ink release characteristics compared to conventional mechanically engraved chrome roller technology.

Flexography prints can be made with a flexible printing plate that is wrapped around a rotating cylinder. The plate is usually made of natural or synthetic rubber or a photosensitive plastic material called photopolymer. It is usually attached to the plate cylinder with double-sided sticky tape. Flexography is a relief printing process, meaning that the image area on the printing plate is raised above the non-image area.

The image area receives the ink from the anilox roller, which is transferred to the print substrate when the latter is pressed with support of the impression cylinder against the printing plate. Flexography is a direct method, that is, the printing plate transfers the ink directly to the substrate.

Due to improved registration, a popular type of press is the CI press (central-impression) where printing units are arranged around a single central impression cylinder.

In general, the higher the speed of the press, the wider the press will be. When the press is wider and faster, the diameter of the anilox roller must be greater in order to prevent damage to the roller due to deflection and bending. A 50-inch (ca 127 cm) machine has a 6-inch (ca 15 cm) diameter anilox cylinder. The dwell time between the chamber and the ink transfer nip is shorter.

Linear speeds in excess of 1800 ft/min (ca 0.549 km/min) are considered high speed for printing flexible substrates, and presses with the capability of printing at a linear speed of 3300 ft/min (ca 1 km/min) are now appearing on the market. The linear speed of 3300 ft/min (ca 1 km/min) is equal to a linear velocity of 35 miles per hour (ca 56.3 km/hr), and conventional plates and the double-sided sticky tape will eject from the press at this speed. In place of plates and double-sided sticky tape, direct laser engraved elastomer sleeves are used for printing at these velocities. The usual chambered doctor blade has a two-inch gap between the blades, and the dwell time for this distance at 3300 ft/min (ca 1 km/min) is less than the time of a high speed shutter on a 35 mm camera. In that interval, the air must be displaced from the cells of the anilox, ink must enter the cells, and the air must be cycled out from the chamber.

At linear speeds up to 2300 ft/min (ca 0.701 km/min), normal motors can be used; however, at linear speeds over 2300 ft/min water-cooled motors are preferred.

Many printers require inks and coatings to print at high speeds in order to improve the cost effectiveness of their operations. Flexographic printing linear speeds generally range up to 2000 ft/min (ca 0.609 km/min), and that speed can be expected to increase. At increasing linear speeds, for example greater than 1200 ft/min (ca 0.366 km/min), and especially 1800 ft/per minute (ca 0.549 km/min), the printability of the ink begins to deteriorate and print defects can be observed. This defect can be described as uniformly dispersed, irregularly shaped missed areas of printing. These defects are believed to result from the inability of the ink to wet out the surfaces of the printing blanket or plate or the substrate, or from the distinct mechanistic demands associated with a high speed printing press configuration as discussed in the above paragraphs.

Gravure printing is an example of intaglio printing. It uses a depressed or sunken surface for the image so that the image areas is generally honey comb shaped cells or wells that are etched or engraved into a printing cylinder. The unetched areas of the cylinder represent the non-image or unprinted areas. The cylinder rotates through an ink bath and excess ink is wiped off the cylinder by a flexible steel doctor blade. The ink remaining in the recessed cells forms the image by direct transfer to the substrate (paper or other material) as it passes between the plate cylinder and the impression cylinder.

Gravure inks are fluid inks with a very low viscosity that allows them to be drawn into the engraved cells in the cylinder then transferred onto the substrate. Flexographic and gravure inks are very similar and the basic constituents are essentially the same.

The transfer of ink to the substrate may be one of the most important factors affecting the quality of the final printed product. However, due to dynamics of linear high-speed presses, conventional inks used for slower speeds will breakdown at high speeds, creating print defects. Any print defect will negatively affect productivity and the inherent printing advantages of using linear high-speed presses.

Typical flexographic/gravure printing inks contain resins, solvents, colorants, and additives. The resins include rosin esters, polyamides, polyurethanes, nitrocellulose, and others. The solvents are often based on alcohols, acetates, glycol ethers, and possibly other solvent classes.

Suspensions form the backbone of several industrial materials such as coatings, inks, paints, ceramics and cosmetics. The control and improvement of the rheology and stability of such materials in chemical engineering processes have been a significant concern of scientists and engineers for decades. One significant feature of suspensions rheology is their viscoelastic properties. Viscoelastic properties of a fluid relates to the extent of the solid-like or liquid-like character of the fluid.

There are some articles in the literature studying the viscoelastic properties of paste inks. See, e.g., U.S. Pat. Nos. 7,267,055B2 and 6,602,333B2. However, the viscoelasticity of flexographic inks is rarely determined in the industry as the common assumption of flexo inks is not considering any viscoelasticity in such low viscosity inks. Rare occasions can be found on discussing the viscoelasticity water-based flexo inks and its relation with certain performance factors. One example is the work of Mai R., Pekarovicova A., Fleming III, P. D., Savarmand, S., and Chandorkar, O. V., "Ink Rheology and Press Performance of Water-based Flexographic Inks," Flexo, 49-53 (October 2007). This work concludes that the more elastic the ink, the less dot gain.

Pinholing is one example of common runnability problems for the high-speed printing of the flexographic and rotogravure inks, and thus for the quality of the print derived therefrom. There is a need to reduce pinholing for the high-speeding printing of the flexographic and rotogravure inks.

The inventors of the present application discovered one factor relating to the pinholing defect on the surface of flexographic and rotogravure prints is the viscoelasticity of the ink. It is observed that a more elastic flexographic or rotogravure ink delays the formation of pin-holes on the final print to higher printing speeds, and a postulated mechanism for this relates to its action in relaxing nonuniformities caused by the ink transfer and film-split.

SUMMARY OF THE INVENTION

The present inventions discloses a method of formulating an ink for high-speed printing, and the method includes measuring the phase angle of the ink and controlling the phase angle of the ink to less than 60°, 50°, or 45° at a frequency of 10 Hz when the ratio of the total non-volatiles volume fraction of the ink to the maximum total non-volatiles volume fraction of the ink is a ratio between about 0.40 to about 0.90, a ratio between about 0.50 to about 0.80, or a ratio about 0.6 to about 0.75. The phase angle can be controlled by selecting resins, solvents, colorants, and additives in the ink. The phase angle can also be controlled by modifying an affinity of additives in the ink, modifying a solvent in the ink, modifying a solvency parameter of the solvent, adding a chemical for reversibly binding to a polymer in the ink, or modifying a reversible hydrogen bonding in the ink. The ink can be a flexographic ink, a rotogravure ink, a heatset offset ink, or a publication gravure ink. The ink can be adapted for printing at a speed of greater than 1200 feet/min or at a speed of greater than 1800 feet/min.

The present invention discloses an ink for high-speed printing, and the ink includes one or more resins, one or more colorants, one or more solvents, and one or more additives. The phase angle of the ink can be less than 60°, 50°, or 45° at a frequency of 10 Hz when the ratio of the total non-volatiles volume fraction of the ink to the maximum total non-volatiles volume fraction of the ink is a ratio between about 0.40 to about 0.90, a ratio between about 0.50 to about 0.80, or a ratio about 0.6 to about 0.75. The one or more resins can be polyamides, polyurethanes, rosin esters, metallized rosin esters, nitrocellulose, phenolic resins, modified rosin phenolic resins, alkydes, hydrocarbon resins, asphalts, or metallic resinates, and can be about 5 to 30 wt % of the ink. The one or more colorants can be about 4 to 25 wt % of the ink. The one or more solvents can be water, ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, or xylenes, and can be about 40 to 70 wt % of the ink. A print of the ink can include less than 1% of pinholes by area.

The present invention discloses a method of printing, and the method includes providing an ink, the ink having the phase angle of the ink of less than 60°, 50°, or 45° at a frequency of 10 Hz when the ratio of the total non-volatiles volume fraction of the ink to the maximum total non-volatiles volume fraction of the ink is a ratio between about 0.40 to about 0.90, a ratio between about 0.50 to about 0.80, or a ratio about 0.6 to about 0.75, and applying the ink to a substrate, the substrate moving at a speed of greater than 1200 feet/min.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitutes a part of this specification, illustrate embodiments of the invention and together with the description serve to explain the principles of the invention.

DETAILED DESCRIPTION OF THE ILLUSTRATED EMBODIMENTS

Figure 1:
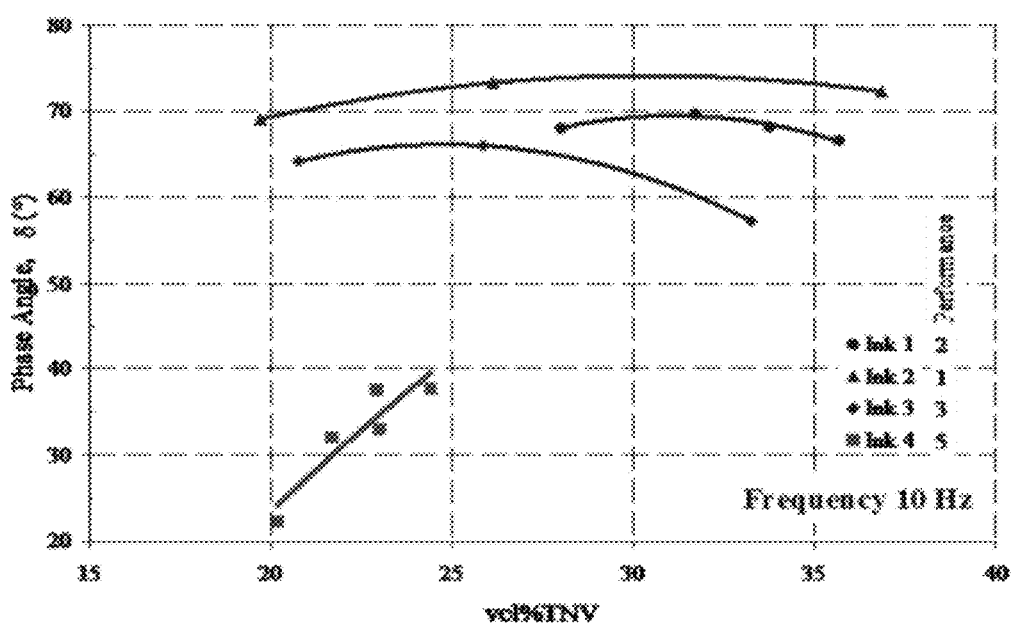
FIG. 1 shows the plot of the phase angle of the four inks (#1-4) as a function of vol % TNV (total non-volatiles), where vol % TNV (total non-volatiles) denotes the total non-volatiles volume fraction (percentage), a parameter commonly used in ink industry rather than solids fraction.

Reference will now be made in detail to embodiments of the present invention, example of which is illustrated in the accompanying drawing.

A viscoelastic fluid has partial contributions of the characteristics of a pure elastic solid as well as those of a pure inelastic (viscous) liquid. The characteristic of a pure elastic solid, such as a perfect Hookian spring, is that if it is exposed to a certain deformation due to an external force or stress, upon releasing the imposing force or stress, the perfect elastic solid can completely return to its original shape or position. By "certain deformation," a small enough deformation is meant that does not deform the material beyond its structural tolerance. Therefore, the structural bonds in the material microstructure do not break. This is commonly referred to as Linear Viscoelastic Region (LVR). On the other hand, the characteristic of a pure inelastic (viscous) liquid, such as a perfect Newtonian liquid, is that if it is exposed to a certain deformation due to an external force or stress, upon releasing the imposing force or stress, the perfect inelastic liquid completely takes the new shape or position. And the energy that was spent to cause the deformation will be dissipated to heat due to viscous nature of the inelastic liquid. A good measure of viscoelasticity is the phase angle between the imposing stress and the resultant deformation in the matter. In shear flows where parallel layers of fluid are sliding on each other, a sinusoidal shear deformation can develop a sinusoidal shear stress within the fluid layers. For small amplitude shear flows one can write:

$$\gamma = \gamma^0 \sin(\omega t) \quad (1)$$

$$\tau = \tau^0 \sin(\omega t + \delta) \quad (2)$$

where $\gamma$, $\tau$, $\omega$, and t denote the shear strain, shear stress, angular frequency of the oscillation and time, respectively. The superscript "0" represents the magnitude of the amplitude of oscillation. $\delta$ is the phase angle between the shear strain and shear stress and is always between 0 and 90° (degrees). $\delta=0$ refers to a pure elastic solid while $\delta=90°$ refers to a pure inelastic (viscous) liquid. For any viscoelastic material we have $$0 \leq \delta \leq 90° \qquad (3).$$

There are various mechanisms responsible for the viscoelastic properties and their modifications. Viscoelasticity of an ink can be modified by the use of a modifying binder/extender/pigment of a particular affinity for one or more of the polymers in the ink etc. Viscoelasticity can be modified through a modifying solvent or solvents or plasticizer which has a specific interaction with the binder/extender/pigment. It can also be modified through the solvency parameter of the modifying solvent(s) or plasticizer changes during the drying of the ink/coating/adhesive/paint so that the viscoelasticity changes during the drying process. The advantage of the latter is to achieve one ink of maximum printability and maximum lamination bond strength or other performance parameter. Viscoelasticity can be modified viscoelasticity through a chemical(s) that binds reversibly to the polymer in the ink etc. Viscoelasticity can be modified where the mechanism of viscoelastic change involves reversible hydrogen bonding leading to reversible conformational changes of the main polymer in the ink etc. Viscoelasticity can be modified by a second or other polymer of different viscoelasticity to the first or main polymer in the ink. Viscoelasticity can be modified by some additives, commonly referred to as "rheology modifiers."

The ink for high speed printing includes printing ink resins or binders, dispersed colorants (optional), solvents, and various additives. The ink resins can include polyamides, polyurethanes, rosin esters, metallized rosin esters, nitrocellulose, phenolic resins, modified rosin phenolic resins, alkydes, hydrocarbon resins, asphalts, metallic resonates, or other printing ink resins. The dispersed colorants can be any of a number of various pigments, pigment dispersions, or other colorants. The solvents can be any of a number of organic solvents, such as those selected from various alcohols, acetates, and glycol ether solvents. Typical examples include ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, and xylenes. The solvent component may also include water in an amount of up to about 5 wt %, and preferably about 0.5 to 2% when present.

An extensive listing of commercially available resins, solvents, and colorants, as well as other conventional components, can be found in The Printer's Manual, RIT Cary Graphic Arts Press (2005), which is hereby incorporated herein by reference. Drying of the composition can be by application of heat or actinic radiation, and in the latter instance photoinitiators may be present.

In general, the binder resin component is about 5 to 30 wt % of the composition, preferably about 10 to 15 wt %, the solvent is about 40 to 70 wt % of the composition, preferably about 60 to 70 wt %, the colorant when present is about 4 to 25 wt % of the composition, preferably about 15 to 18 wt %, additives when present are about 0-5%, and the other components make up the balance. Water, when present, is up to about 5 wt %, preferably about 0.5 to 2%, in so-called solvent-based inks, when it is not the main solvent.

The binder system of the ink formulations is selected in order to provide the range of printing properties which are required for flexographic, rotogravure, heatset offset, or publication gravure printing, in terms of the final properties of the printed films with respect to print quality and aesthetics, color, opacity, ink adhesion and lamination properties, barrier properties, pigment dispersion, special effects, blocking requirements, sealing properties, surface resistance, drying, and myriad others. The colorant is selected to provide a typical full gamut of hues typical of flexographic and rotogravure printing, and to be consistent with the required properties and print quality as noted above. The inks of the present invention will contain various additives, such as slip agents, waxes, plasticizer, slip additive, defoamer, adhesion promoter, biocide, and others typically used in flexographic and rotogravure inks to achieve required properties as described above.

The inventors of the present invention discovered that the ink viscoelasticity can be used as a guiding formulation parameter for inks, especially those used under high speed printing conditions. In a PCT application (International Application No. PCT/US2011/026671), titled "Surface Tension of Inks For High Speeding Printing" and filed on Mar. 1, 2011, some of the inventors of the present invention discovered that one factor relating to the pinholing is the surface tension of the ink. International Application No. PCT/US2011/026671 application "Surface Tension of Inks For High Speeding Printing" is hereby incorporated herein by reference for all purposes.

The inks can be flexographic ink, rotogravure ink, heatset offset ink, or publication gravure ink, and be solvent-based. Although viscoelasticity is appreciated in processing of paste inks and ink-jet inks due to its more obvious relevance in the formation of filaments and droplets, the significance of viscoelasticity in the processing of high speeding printing has not been appreciated. Because the pinholing relates to how the ink levels or settles on the substrate at the high speed of the print, the mechanism through which the transition from liquid-like to solid-like behaviors of the ink occurs becomes important.

The viscoelasticity of an ink as its solvents evaporates has the impact on print performance, such as pin-holing, in a way that the more elastic ink causes the less pin-holing defect. The viscoelasticity can be obtained at various levels of solvents. The solvents were extracted using a rotovap to increase the total non-volatiles content and simulate the drying process after the transfer of the ink. The viscoelasticity can be determined through a shear oscillatory test. The viscoelastic phase angle of an ink can be measured by carrying out drying studies in which an ink is gradually dried using rotary evaporation and the resulting ink formulation is analyzed stepwise as the drying progresses.

An individual skilled in the art will appreciate how to perform a shear oscillatory test of strain amplitude sweep at a given frequency and determine the phase angle of the linear viscoelastic range where elastic and loss moduli are independent of the magnitude of the strain amplitude.

The oscillatory shear tests can be carried out at various frequencies. A common frequency of 10 Hz was found suitable to obtain oscillatory results for all samples at various total non-volatiles contents. Comparing the phase angles of the samples need to be at the same frequency. Therefore it is important to apply a frequency that leads to valid oscillatory readings for all the samples. The frequency of 10 Hz is such a frequency.

The oscillatory shear tests test are conducted on fresh samples at various total non-volatiles volume fractions. The total non-volatiles volume fractions range, for example, from 10% to 40%. The maximum total non-volatiles fraction of the ink is the total non-volatiles fraction when the ink is completely dried or cured. The ratio of the total non-volatiles volume fraction of the ink to the maximum total non-volatiles volume fraction of the ink can be then calculated. The ratio of the total non-volatiles volume fraction of the ink to the maximum total non-volatiles volume fraction of the ink in a press ready ink state is about 0.35 to 0.55. When the ink is completely dried or cured, the ratio of a total non-volatiles volume fraction of the ink to a maximum total non-volatiles volume fraction of the ink increases to about 1.

In one embodiment of the present invention, standard and conventional ink ingredients are used to formulate the ink for high speed printing but are selected such that the phase angle is below about 60°, preferably below about 50°, and more preferably below about 45°. As noted above, the determination of the phase angle is known in the art, but not its importance as a predictor of print quality. The phase angles of an ink at different non-volatiles volume fractions may be different. The phase angle can be measured at a specific total non-volatiles volume fraction. The specific total non-volatiles volume fraction can be used to calculate the ratio of a total non-volatiles volume fraction of the ink to a maximum total non-volatiles volume fraction. Preferably, the phase angle is determined when the total non-volatiles volume fraction is 10% to 40%. Also preferably, the phase angle is measured when the ratio of the total non-volatiles volume fraction of the ink to the maximum total non-volatiles volume fraction is from 0.35 to 1.0, because the ratio in a press ready ink state is about 0.35 to 0.55 and the ratio of the ink in a completely dried or cured ink is about 1. Also preferably, the ratio can be between about 0.40 to about 0.90, between about 0.50 to about 0.80, or between about 0.60 to about 0.75.

Examples

Four flexographic inks with different pinholing performances were investigated. The inks are identified below as Inks 1, 2, 3, and 4. The inks' compositions are listed in Table 1.

TABLE 1

|  | Ink 1 | Ink 2 | Ink 3 | Ink 4 |
|---|---|---|---|---|
| Solvents | n-Propyl alcohol<br>n-Propyl acetate<br>Isopropyl acetate<br>Propylene glycol<br>monoalkyl ether | n-Propyl alcohol<br>n-Propyl acetate<br>Diacetone alcohol<br>Propylene glycol<br>monoalkyl ether | n-Propyl alcohol<br>n-Propyl acetate<br>Diacetone alcohol<br>Propylene glycol<br>monoalkyl ether | n-Propyl alcohol<br>Propylene glycol<br>monoalkyl ether<br>Diacetone alcohol<br>Dipropylene glycol<br>monoalkyl ether |
| Resins | Polyamide<br>Nitrocellulose | Rosin Ester<br>Polyamide | Polyurethane | Rosin ester<br>Polyamide |

The choice of specific solvents and actual percentages are developed by consideration of the following two guiding principles: solubility behavior of resin blends in the solvent combinations throughout drying process and the evaporative profiles of the combined solvent blends define the evolution of composition.

Phase angles of these inks were obtained at various total non-volatiles volume fractions (vol % TNV). The solvents were extracted using a rotovap to increase the total non-volatiles fraction and simulate the drying process after the transfer of the ink. Oscillatory shear experiments were carried out at various frequencies. A common frequency of 10 Hz was found suitable to obtain oscillatory results for all samples at various total non-volatiles fractions. Comparing the phase angles of the samples need to be at the same frequency. Therefore it is important to apply a frequency that leads to valid oscillatory readings for all the samples. The phase angles of the four inks at 10 Hz were obtained and are shown in FIG. 1, which plots the phase angle in degrees as a function of vol % TNV (total non-volatiles) where vol % TNV (total non-volatiles) denotes the total non-volatiles volume fraction (percentage).

Figure 2:
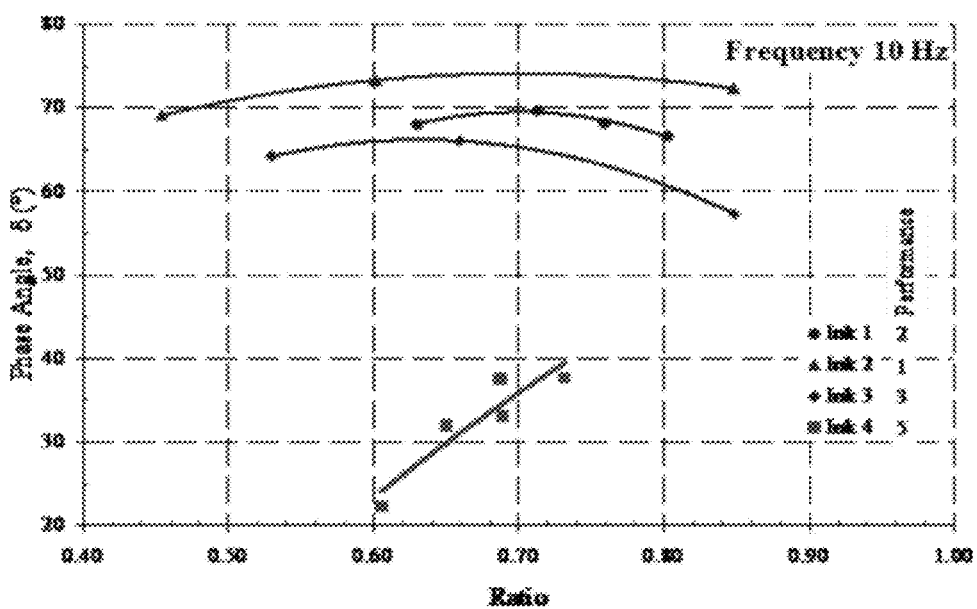
FIG. 2 shows the plot of the phase angle of the four inks (#1-4) as a function of the ratio, where ratio denotes the ratio of the total non-volatiles volume fraction to the maximum total non-volatiles volume fraction.

The maximum total non-volatiles volume fractions of the four inks are measured. The ratios of the total non-volatiles volume fraction of the ink to the maximum total non-volatiles volume fraction of the ink are then calculated. FIG. 2 plots the phase angle in degrees as a function of the ratio where the ratio denotes the ratio of the total non-volatiles volume fraction of the ink to the maximum total non-volatiles volume fraction of the ink.

Figure 3:
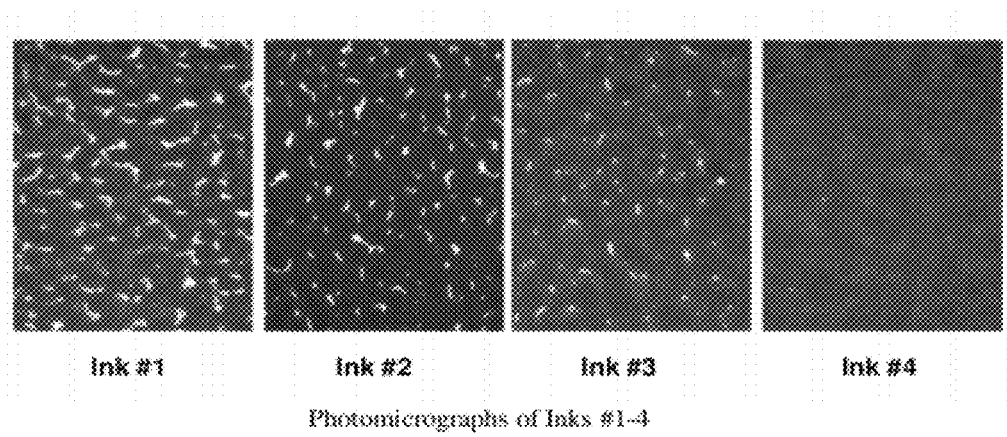
FIG. 3 shows the photomicrographs of the four inks (#1-4).

The photomicrographs of the prints of the four inks at 1800 ft/min (ca 9 m/s) are shown in FIG. 3. The photomicrographs were captured using Olympus Vanox research microscope (5× objective–area 1.5 mm×1.2 mm). The percentages of pinholes (by area) in the prints were measured using Olympus AnalySIS software for image analysis, and are listed in Table 2.

TABLE 2

|  | Ink 1 | Ink 2 | Ink 3 | Ink 4 |
|---|---|---|---|---|
| Pinholes (%) | 8.5 | 4.6 | 2.2 | 0.5 |

The less pinholes (%) (by area), the better printing quality. A pinholes (%) (by area) of less than 1% is generally considered the best performance. Of the four inks, Ink 4 provides the best printing quality at 1800 ft/min, and Ink 1 provides the poorest printing quality. It can also be seen that the smallest phase angle corresponds to the best pin-holing performance (least pin-holing). As the level of phase angle increases, the pin-holing performance deteriorates.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of formulating an ink for high-speed printing comprising:
   measuring the phase angle of the ink, and
   controlling the phase angle of the ink to less than 60° at a frequency of 10 Hz when the ratio of the total non-volatiles volume fraction of the ink to the maximum total non-volatiles volume fraction of the ink is a ratio between about 0.40 to about 0.90.

2. The method according to claim 1, wherein the phase angle is controlled to less than 50° at a frequency of 10 Hz.

3. The method according to claim 1, wherein the phase angle is controlled to less than 45° at a frequency of 10 Hz.

4. The method according to claim 1, wherein the phase angle is controlled by selecting resins, solvents, colorants, and additives in the ink.

5. The method according to claim 1, wherein the ink is a flexographic ink, a rotogravure ink, a heatset offset ink, or a publication gravure ink.

6. The method according to claim 1, wherein the ratio of the total non-volatiles volume fraction of the ink to the maximum total non-volatiles volume fraction of the ink is a ratio between about 0.50 to about 0.80.

7. The method according to claim 1, wherein the ratio of the total non-volatiles volume fraction of the ink to the maximum total non-volatiles volume fraction of the ink is a ratio between about 0.60 to about 0.75.

8. An ink for high-speed printing comprising:
one or more resins;
one or more colorants;
one or more solvents; and
one or more additives,
wherein the phase angle of the ink is less than 60° at a frequency of 10 Hz, and the phase angle is measured when the ratio of the total non-volatiles volume fraction of the ink to the maximum total non-volatiles volume fraction of the ink is a ratio between about 0.40 to about 0.90.

9. The ink according to claim 8, wherein the phase angle is less than 50° at a frequency of 10 Hz.

10. The ink according to claim 8, wherein the phase angle is less than 45° at a frequency of 10 Hz.

11. The ink according to claim 8, wherein the ink is a flexographic ink, a rotogravure ink, a heatset offset ink, or a publication gravure ink.

12. The ink according to claim 8, wherein the one or more resins are selected from the group consisting of polyamides, polyurethanes, rosin esters, metallized rosin esters, nitrocellulose, phenolic resins, modified rosin phenolic resins, alkydes, hydrocarbon resins, asphalts, and metallic resinates, and the one or more resins are about 5 to 30 wt % of the ink.

13. The ink according to claim 8, wherein the one or more colorants are about 4 to 25 wt % of the ink.

14. The ink according to claim 8, wherein the one or more solvents are selected from the group consisting of water, ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, and xylenes, and the one or more solvents are about 40 to 70 wt % of the ink.

15. The ink according to claim 8, wherein a print of the ink includes less than 1% of pinholes by area.

16. The ink according to claim 8, when the ratio of the total non-volatiles volume fraction of the ink to the maximum total non-volatiles volume fraction of the ink is a ratio between about 0.50 to about 0.80.

17. The ink according to claim 8, when the ratio of the total non-volatiles volume fraction of the ink to the maximum total non-volatiles volume fraction of the ink is a ratio between about 0.60 to about 0.75.

18. A method of printing comprising:
providing an ink, the ink having the phase angle of the ink of less than 60° at a frequency of 10 Hz when the ratio of the total non-volatiles volume fraction of the ink to the maximum total non-volatiles volume fraction of the ink is a ratio between about 0.40 to about 0.90, and
applying the ink to a substrate, the substrate moving at a speed of greater than 1200 feet/min.

19. The method according to claim 18, wherein the phase angle is less than 50° at a frequency of 10 Hz.

20. The method according to claim 18, wherein the phase angle is less than 45° at a frequency of 10 Hz.

21. The method according to claim 18, when the ratio of the total non-volatiles volume fraction of the ink to the maximum total non-volatiles volume fraction of the ink is a ratio between about 0.50 to about 0.80.

22. The ink according to claim 18, when the ratio of the total non-volatiles volume fraction of the ink to the maximum total non-volatiles volume fraction of the ink is a ratio between about 0.60 to about 0.75.

* * * * *